United States Patent
Xiao

(10) Patent No.: US 10,914,974 B1
(45) Date of Patent: Feb. 9, 2021

(54) DISPLAY DEVICE

(71) Applicant: WUHAN CHINA STAR OPTOELECTRONICS TECHNOLOGY CO., LTD, Hubei (CN)

(72) Inventor: Shiyuan Xiao, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/631,171

(22) PCT Filed: Aug. 26, 2019

(86) PCT No.: PCT/CN2019/102598
§ 371 (c)(1),
(2) Date: Jan. 15, 2020

(51) Int. Cl.
*G02F 1/1333* (2006.01)

(52) U.S. Cl.
CPC ............... *G02F 1/133308* (2013.01); *G02F 2001/133314* (2013.01); *G02F 2001/133317* (2013.01); *G02F 2001/133331* (2013.01); *G02F 2202/28* (2013.01)

(58) Field of Classification Search
None
See application file for complete search history.

(56) References Cited

U.S. PATENT DOCUMENTS

| 2012/0281383 A1* | 11/2012 | Hwang | G02B 30/25 361/807 |
| 2019/0212606 A1* | 7/2019 | Koda | G02B 6/0088 |

* cited by examiner

*Primary Examiner* — Ashok Patel
(74) *Attorney, Agent, or Firm* — Mark M. Friedman

(57) ABSTRACT

A display device is provided. The display device includes a display panel, a backlight module, and a cover plate. The backlight module includes a supporting frame, and the supporting frame includes a first base plate and a first side plate connected to the first base plate. A bonding layer is provided between the first side plate and the cover plate to attach the first side plate to the cover plate. A limiting portion is provided on the first side plate and/or the cover plate close to the bonding layer to block the bonding layer from flowing into an inside of the display device, thereby improving the user experiences, and increasing the product market competitiveness.

19 Claims, 3 Drawing Sheets

DISPLAY DEVICE

FIELD OF INVENTION

The present disclosure relates to fields of display technology, and in particular to display devices.

BACKGROUND OF INVENTION

A display panel acts as an important part of a display device, and the reliability of the display panel directly affects the quality of the display device, especially display devices used in industrial and vehicle products, particularly in vehicle products. Currently, the commonly used solutions for vehicle display devices between a cover plate and a display panel include a tape fixing manner and a glue dispensing fixing manner. The glue dispensing process is more and more popularly used in vehicle display devices due to its desirable sealing and adhesion.

A basic structure of an existing vehicle display device includes a display panel, a backlight module, and a cover plate disposed on the display panel. The backlight module includes a supporting frame. Adhesion between the supporting frame and the cover plate by a bonding layer (usually a glue) achieves a purpose of fixing the display device. However, because the bonding layer has flowability, it easily enters the inside of the display device, thereby affecting the product performance and reducing the product lifespan.

In summary, it is necessary to provide a novel display device to solve the above-mentioned technical problem.

SUMMARY OF INVENTION

Technology problem: The present disclosure provides a display device, which solves the existing problem of the display devices that due to the flowability of the bonding layer provided between the cover plate and the supporting frame, the bonding layer easily enters the inside of the module of the display device, thereby affecting the product performance and reducing the product lifespan.

To solve the above-mentioned problem, the technical solutions provided by the present disclosure are as follows:

An embodiment of the present disclosure provides a display device including: a display panel, a backlight module, and a cover plate disposed on the display panel; wherein the backlight module includes: a supporting frame including a first base plate and a first side plate connected to the first base plate;

wherein an adhesive layer is coated between the cover plate and the display panel to attach the cover plate and the display panel, a bonding layer is provided between the first side plate and the cover plate to attach the first side plate and the cover plate; and a limiting portion is provided on the first side plate and/or the cover plate near the bonding layer to block the bonding layer from flowing into an inside of the display device.

According to a display device provided by an embodiment of the present disclosure, the limiting portion is disposed on an end surface of the first side plate close to the cover plate.

According to a display device provided by an embodiment of the present disclosure, the limiting portion includes a protrusion provided on the end surface of the first side plate close to the cover plate, and the protrusion is close to a side of an inner side wall of the first side plate and is flush with the inner side wall of the first side plate.

According to a display device provided by an embodiment of the present disclosure, a groove is provided at a side of the cover plate close to the display panel, and the protrusion and the groove are matched with each other.

According to a display device provided by an embodiment of the present disclosure, the protrusion is integrally formed with the first side plate.

According to a display device provided by an embodiment of the present disclosure, the first side plate is disposed around a peripheral side of the first base plate, a receiving cavity is formed between the first side plate, the first base plate, and the cover plate, and the display panel and the backlight module are both located in the receiving cavity.

According to a display device provided by an embodiment of the present disclosure, the backlight module further includes a reflector, a light guide plate, and an optical film in the receiving cavity stacked from bottom to top, the reflector, the light guide plate, and the optical film are all parallel to the first base plate, and the reflector is fixedly disposed on the first base plate.

According to a display device provided by an embodiment of the present disclosure, the display device further includes a middle frame including a second base plate and a second side plate connected to the second base plate, the second side plate is located between the display panel and an inner side wall of the first side plate, and the display panel is fixedly disposed on the second base plate.

An embodiment of the present disclosure provides a display device including: a display panel, a backlight module, and a cover plate disposed on the display panel; wherein the backlight module includes: a supporting frame including a first base plate and a first side plate connected to the first base plate;

wherein a bonding layer is provided between the first side plate and the cover plate to attach the first side plate and the cover plate; and a limiting portion is provided on the first side plate and/or the cover plate near the bonding layer to block the bonding layer from flowing into an inside of the display device.

According to a display device provided by an embodiment of the present disclosure, the limiting portion is disposed on an end surface of the first side plate close to the cover plate.

According to a display device provided by an embodiment of the present disclosure, the limiting portion includes a protrusion provided on the end surface of the first side plate close to the cover plate, and the protrusion is close to a side of an inner side wall of the first side plate and is flush with the inner side wall of the first side plate.

According to a display device provided by an embodiment of the present disclosure, a groove is provided at a side of the cover plate close to the display panel, and the protrusion and the groove are matched with each other.

According to a display device provided by an embodiment of the present disclosure, the protrusion is integrally formed with the first side plate.

According to a display device provided by an embodiment of the present disclosure, a height of the protrusion ranges from 0.1 to 0.5 mm; and a width of the protrusion is large than or equal to 0.8 mm.

According to a display device provided by an embodiment of the present disclosure, magnetic members are respectively provided on the end surface of the first side plate corresponding to the protrusion and a lower end surface of the protrusion.

According to a display device provided by an embodiment of the present disclosure, the first side plate is disposed around a peripheral side of the first base plate, a receiving cavity is formed between the first side plate, the first base plate, and the cover plate, and the display panel and the backlight module are both located in the receiving cavity.

According to a display device provided by an embodiment of the present disclosure, the backlight module further includes a reflector, a light guide plate, and an optical film in the receiving cavity stacked from bottom to top, the reflector, the light guide plate, and the optical film are all parallel to the first base plate, and the reflector is fixedly disposed on the first base plate.

According to a display device provided by an embodiment of the present disclosure, the display device further includes a middle frame including a second base plate and a second side plate connected to the second base plate, the second side plate is located between the display panel and an inner side wall of the first side plate, and the display panel is fixedly disposed on the second base plate.

According to a display device provided by an embodiment of the present disclosure, the bonding layer is formed of a flowability adhesive material.

According to a display device provided by an embodiment of the present disclosure, the display device is a vehicle-mounted display device.

Beneficial effect: The beneficial effect of the present disclosure is that: in the display device according to the present disclosure, a limiting portion is disposed on the supporting frame of the backlight module to prevent the bonding layer used for adhesion between the cover plate and the supporting frame from entering the inside of the display device during a dispensing process, thereby eliminating a risk of the bonding layer entering the inside of the display device and affecting the display performance, improving the user experiences, and increasing the product market competitiveness.

DRAWINGS

In order to explain the technical solution in the embodiment or the prior art more clearly, the drawings used in the description of the embodiments or the prior art will be briefly introduced below. It is apparent that the drawings in the following description are merely some embodiments of the present disclosure, those skilled in the art can obtain other drawings based on these drawings without paying any creative work.

DETAILED DESCRIPTION OF EMBODIMENTS

Figure 1:
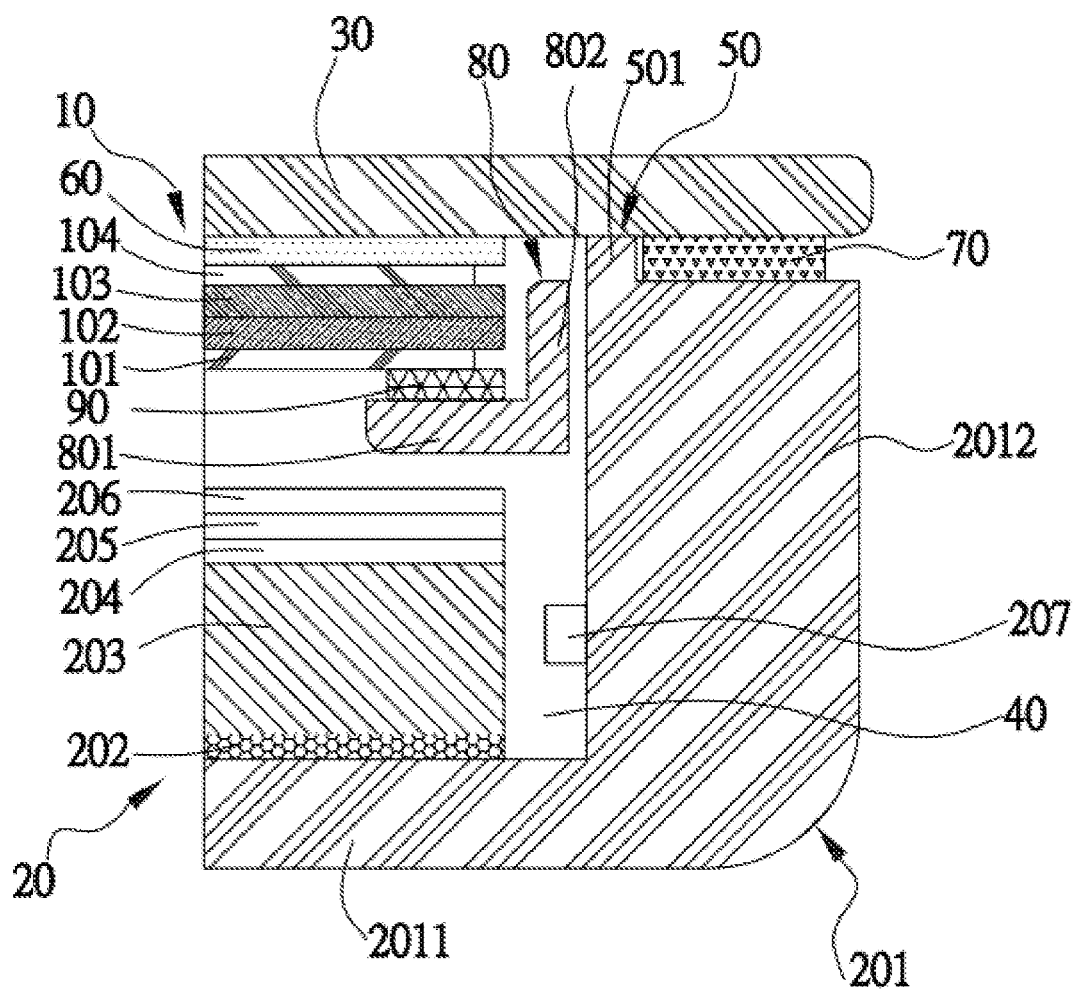
FIG. 1 is a schematic cross-sectional view of a display device according to an embodiment of the present disclosure.

The following descriptions of the embodiments are made with reference to accompanying drawings to illustrate specific embodiments in which the present disclosure can be implemented. The directional terms mentioned in the present disclosure, such as up, down, front, rear, left, right, inside, outside, side, etc., are only for reference the direction of the accompanying drawings. Therefore, the directional terms used are for explaining and understanding the present disclosure, but not for limiting the present disclosure. In the drawings, similarly structured units are denoted by the same reference numerals.

The present disclosure is directed to the display devices in the prior art. Because the bonding layer provided between the cover plate and the supporting frame has flowability, it is easy to enter the inside of the display device, thereby affecting product performance. The present embodiments can solve this defect.

Referring to FIG. 1, a display device provided by an embodiment of the present disclosure includes a display panel 10, a backlight module 20, and a cover plate 30 disposed on the display panel 10.

The display panel 10 includes a lower polarizer 101, an array substrate 102, a color filter substrate 103, and an upper polarizer 104 sequentially stacked from bottom to top. The array substrate 102 and the color filter substrate 103 are disposed opposite each other. The array substrate 102 may be a low temperature poly-silicon (LTPS) array substrate. Furthermore, the display panel 10 may be a touch display panel, and further includes a touch screen body disposed above the upper polarizer 104 (not shown).

Material of the cover plate 30 is glass to protect the display panel 10. Specifically, an adhesive layer 60 is coated between the cover plate 30 and the display panel 10 to attach the cover plate 30 to the display panel 10. The adhesive layer 60 may be made of materials, such as optical clear resin (OCR) or optically clear adhesive (OCA).

The backlight module 20 includes a supporting frame 201. The supporting frame 201 includes a first base plate 2011 and a first side plate 2012 connected to the first base plate 2011. The first base plate 2011 is located on a back side of the backlight module 20 to support and protect the backlight module 20. The first side plate 2012 is disposed around a peripheral side of the first base plate 2011. The first side plate 2012 and the first base plate 2011 are perpendicular to each other. A receiving cavity 40 is formed between the first side plate 2012 and the first base plate 2011, and the display panel 10 and the backlight module 20 are both located in the receiving cavity 40.

A bonding layer 70 is provided between the first side plate 2012 and the cover plate 30 to attach the first side plate 2012 to the cover plate 30. A limiting portion 50 is provided on an end surface of the first side plate 2012 close to the bonding layer 70 to block the bonding layer 70 from flowing into an inside of the display device. The inside of the display device includes the receiving cavity 40.

It should be noted that an inner side wall of the first side plate 2012 is a side of the first side plate 2012 close to the display panel 10.

Specifically, the bonding layer 70 is formed of a flowability adhesive material. In the embodiment of the present disclosure, material of the bonding layer 70 is a glue. Because the glue has flowability, by disposing the limiting layer portion 50 near a lateral side of the bonding layer 70, the bonding layer 70 can be effectively blocked from flowing into the inside of the display device, and eliminate the risk that the bonding layer 70 affects the display performance of the display device.

Figure 2A:
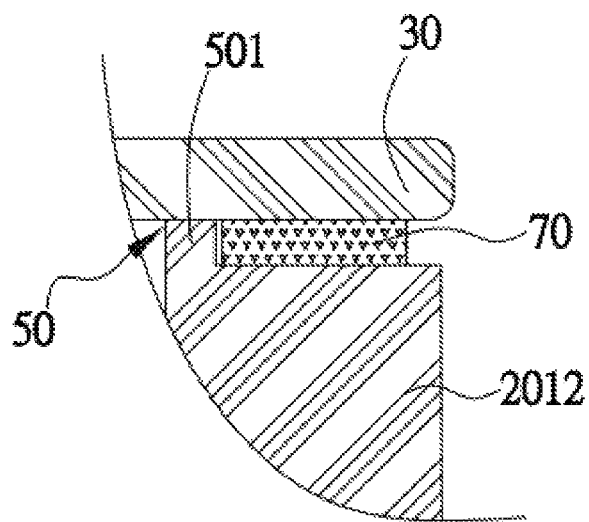
FIG. 2A is a schematic structural view of a position of a first limiting portion according to an embodiment of the present disclosure.

Referring also to FIG. 2A, in an embodiment of the present disclosure, the limiting portion 50 is disposed on an end surface of the first side plate 2012 close to the cover plate 30, and the limiting portion 50 includes a protrusion 501 disposed on the end surface of the first side plate 2012 close to the cover plate 30. An upper surface of the protrusion and a lower surface of the cover plate 30 are seamlessly and closely fitted, and the protrusion 501 is close to a side of an inner side wall of the first side plate 2012. and is flush with the inner side wall of the first side plate 2012 to ensure a maximum coating area of the bonding layer 70, thereby ensuring the adhesion stability between the cover plate 30 and the supporting frame 201, and further improving the stability of the entire display device.

Understandably, in other embodiments, the limiting portion 50 may also be disposed on an end surface of the cover plate 30 close to the first side plate 2012. Accordingly, the limiting portion 50 includes a protrusion 501 provided on the end surface of the cover plate 30 close to the first side plate 2012. A lower surface of the protrusion 501 and an upper surface of the first side plate 2012 are seamlessly and closely fitted, and this embodiment is not described herein in detail again.

Specifically, a cross-sectional shape of the supporting frame 201 is a hollowed square shape (▢), and a cross-sectional shape of a dispensing area is also a hollowed square shape (▢). Therefore, a cross-sectional shape of the limiting portion 50 is also a hollowed square shape (▢), that is, the limiting portion 50 is provided in a peripheral area of the display device.

Specifically, in the embodiment of the present disclosure, a cross-sectional shape of the protrusion 501 is rectangular. Certainly, in other embodiments, the cross-sectional shape of the protrusion 501 may be other shapes, such as trapezoidal, triangular, circular, oval, and other shapes.

Specifically, a height of the protrusion 501 ranges from 0.1 to 0.5 mm; a width of the protrusion 501 is large than or equal to 0.8 mm.

The protrusion 501 is integrally formed with the first side plate 2012. A preparation material of the protrusion 501 and the first side plate 2012 includes, but is not limited to, sheet metal or aluminum alloy. It should be noted that the protrusion 501 and the first side plate 2012 may also be separate structures. After the two structures are separately prepared and formed, the protrusion 501 is attached on the first side plate 2012 by welding or movable connection assembly.

Figure 2B:
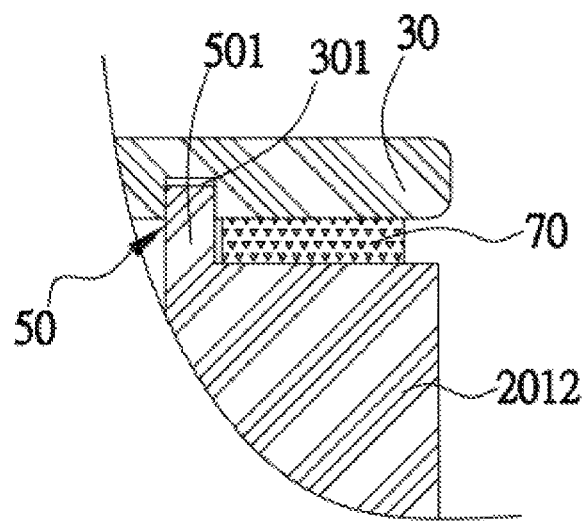
FIG. 2B is a schematic structural view of a position of a second limiting portion according to an embodiment of the present disclosure.

Furthermore, referring to FIG. 2B, a groove 301 is defined by a side of the cover plate 30 close to the display panel 10, and an upper end of the protrusion 501 and the groove 301 match each other. The groove 301 is defined to correspond to the protrusion 501. In a case that the bonding layer 70 located near a lateral side of the protrusion 501 can be blocked from entering the inside of the display device, the force between the cover plate 30 and the protrusion 501 is increased, thereby further improving the adhesion stability between the cover plate 30 and the supporting frame 201, and further improving the stability of the entire display device.

Figure 2C:
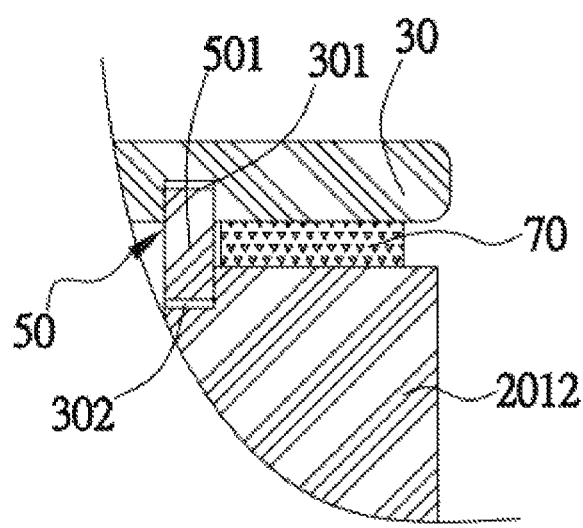
FIG. 2C is a schematic structural view of a position of a third limiting portion according to an embodiment of the present disclosure.

Referring to FIG. 2C, another groove 302 may be further defined by an end surface of the first side plate 2012 close to the cover plate 30, and a lower end of the protrusion 501 and the another groove 302 match each other. The another groove 302 is defined to correspond to the protrusion 501. When the protrusion 501 has problems such as abrasion and stain, etc., the protrusion 501 can be removed from the supporting frame 201 for replacement or cleaning at any time without replacing the whole supporting frame 201. It is convenient and reduces production costs.

In other embodiments, magnetic members (not shown in the figures) may be respectively provided on the end surface of the first side plate 2012 corresponding to the protrusion 501 and a lower end surface of the protrusion 501. The protrusion 501 and the first side plate 2012 are attracted to each other through the magnetic member, thereby achieving attachment.

Continuing to refer to FIG. 1, the backlight module further includes a reflector 202, a light guide plate 203, an optical film, and a light source 207 sequentially stacked from bottom to top in the receiving cavity. A set of the optical film specifically includes a diffuser 204, a lower prism sheet 205 and an upper prism sheet 206. The reflector 202, the light guide plate 203, and the set of the optical film are all parallel to the first base plate 2011, and the reflector 202 is fixedly disposed on the first base plate 2011. In an embodiment, the light source 207 is fixedly disposed on the inner side wall of the first side plate 2012, and a side surface of the light guide plate 203 close to the inner side wall of the first side plate 2012 is a light incident surface, and an upper end face of the light guide plate 203 is an illuminating surface.

The display device further includes a middle frame 80 located in the receiving cavity 40. The middle frame 80 includes a second base plate 801 and a second side plate 802 connected to the second base plate 801. The second base plate 801 is located near a back side of the display panel 10, and the display panel 10 is fixedly disposed on the second base plate 801 through an adhesive layer 90 to maintain a stability of the display panel 10. The adhesive layer 90 can be formed of a double-sided foam. The second side plate 802 is located between the display panel 10 and the inner side wall of the first side plate 2012. The second side plate 802 and the second bottom plate 801 are perpendicular to each other, and the second side plate 802 is parallel to the first side plate 2012.

The middle frame 80 may be made of a plastic material, and a hardness of the middle frame 80 is less than a hardness of the supporting frame 201.

Understandably, when the bonding layer 70 flows out of an outside of the display device, it generally can be cleaned by wiping. Certainly, another limiting portion further may be disposed near a lateral side of the bonding layer 70 close to an outer side wall of the first side plate 2012 to block the bonding layer 70 from flowing out of the display device. The limiting portion is the same as the limiting portion 50 described in the above embodiment, and is not described herein in detail again.

The display device may be a vehicle-mounted display device, which can meet the requirements of the vehicle environment for shaking and fixing. Certainly, the display device can also be applied to any display devices such as mobile phones, tablet computers, and handheld smart devices, etc. Embodiments of the present disclosure should not be limited to these.

The beneficial effect is that: in the display device according to the present disclosure, a limiting portion is disposed on the supporting frame of the backlight module to prevent the bonding layer used for adhesion between the cover plate and the supporting frame from entering the inside of the display device during a dispensing process, thereby eliminating a risk of the bonding layer entering the inside of the display device and affecting the display performance, improving the user experiences, and increasing the product market competitiveness.

In summary, the present disclosure has been disclosed in the above preferred embodiments, but the preferred embodiments are not intended to limit the present disclosure, those skilled in the art can make various modifications and retouch without departing from the spirit and scope of the disclosure, and the scope of the disclosure is defined by the scope defined by the claims.

The invention claimed is:

1. A display device comprising:
a display panel, a backlight module, a cover plate, an adhesive layer, and a bonding layer, the cover plate disposed on the display panel;
wherein the backlight module further comprises:
a supporting frame comprising a first base plate and a first side plate connected to the first base plate,
wherein the cover plate and the supporting frame forms an inside of the display device;
wherein the adhesive layer is coated between a lower surface of the cover plate and an upper surface of the display panel to attach the cover plate and the display panel, the bonding layer is provided between an upper surface of the first side plate and the lower surface of the cover plate to attach the upper surface of the first side plate and the lower surface of the cover plate; and a limiting portion is provided on the upper surface of the first side plate or the lower surface of the cover plate near a side proximity to the inside of the display device to block the bonding layer from flowing into the inside of the display device.

2. The display device according to claim 1, wherein the limiting portion is disposed on an end surface of the first side plate close to the cover plate.

3. The display device according to claim 2, wherein the limiting portion of the first side plate of the backlight module further comprises a protrusion provided on the end surface of the first side plate close to the cover plate, wherein the protrusion is formed as a part of the first side plate or the protrusion is a separated element attached on the end surface of the first side plate, the first side plate defines an inner side wall in a side near the inside of the display device, and the protrusion is positioned close to the side of an inner side wall of the first side plate and is flush with the inner side wall of the first side plate.

4. The display device according to claim 2, wherein the cover plater further has a groove provided at the lower surface of the cover plate positioned corresponding to the protrusion, and the protrusion and the groove are matched with each other.

5. The display device according to claim 3, wherein the display device further comprises a middle frame comprising a second base plate and a second side plate connected to the second base plate, the second side plate is located between the display panel and an inner side wall of the first side plate, and the display panel is fixedly disposed on the second base plate.

6. The display device according to claim 2, wherein the protrusion is integrally formed with the first side plate.

7. The display device according to claim 1, wherein the display device further comprises a receiving cavity defined by the first side plate that is disposed around a peripheral side of the first base plate, wherein the receiving cavity is formed among the first side plate, the first base plate, and the cover plate, and the display panel and the backlight module are both located in the receiving cavity.

8. The display device according to claim 7, wherein the backlight module further comprises a reflector, a light guide plate, and an optical film in the receiving cavity stacked from bottom to top, the reflector, the light guide plate, and the optical film are all parallel to the first base plate, and the reflector is fixedly disposed on the first base plate.

9. A display device comprising:
a display panel, a backlight module, a cover plate, and a bonding layer, the cover plate disposed on the display panel;
wherein the backlight module further comprises:
a supporting frame comprising a first base plate and a first side plate connected to the first base plate,
wherein the cover plate and the supporting frame forms an inside of the display device;
wherein the bonding layer is provided between an upper surface of the first side plate and a lower surface of the cover plate to attach an upper surface of the first side plate and the lower surface of the cover plate; and a limiting portion is provided on the upper surface of the first side plate or the lower surface of the cover plate near a side proximity to the inside of the display device to block the bonding layer from flowing into the inside of the display device.

10. The display device according to claim 9, wherein the limiting portion is disposed on an end surface of the first side plate close to the cover plate.

11. The display device according to claim 10, wherein the limiting portion of the first side plate of the backlight module further comprises a protrusion provided on the end surface of the first side plate close to the cover plate, wherein the protrusion is formed as a part of the first side plate or the protrusion is a separated element attached on the end surface of the first side plate, the first side plate defines an inner side wall in a side near the inside of the display device, and the protrusion is positioned close to the side of an inner side wall of the first side plate and is flush with the inner side wall of the first side plate.

12. The display device according to claim 11, wherein the cover plater further has a groove provided at the lower surface of the cover plate positioned corresponding to the protrusion, and the protrusion and the groove are matched with each other.

13. The display device according to claim 10, wherein the protrusion is integrally formed with the first side plate.

14. The display device according to claim 11, wherein a height of the protrusion ranges from 0.1 to 0.5 mm; and a width of the protrusion is large than or equal to 0.8 mm.

15. The display device according to claim 11, wherein the display device further comprises a middle frame comprising a second base plate and a second side plate connected to the second base plate, the second side plate is located between the display panel and an inner side wall of the first side plate, and the display panel is fixedly disposed on the second base plate.

16. The display device according to claim 9, wherein the display device further comprises a receiving cavity defined by the first side plate that is disposed around a peripheral side of the first base plate, wherein the receiving cavity is formed among the first side plate, the first base plate, and the cover plate, and the display panel and the backlight module are both located in the receiving cavity.

17. The display device according to claim 16, wherein the backlight module further comprises a reflector, a light guide plate, and an optical film in the receiving cavity stacked from bottom to top, the reflector, the light guide plate, and the optical film are all parallel to the first base plate, and the reflector is fixedly disposed on the first base plate.

18. The display device according to claim 9, wherein the bonding layer is formed of a flowability adhesive material.

19. The display device according to claim 9, wherein the display device is a vehicle-mounted display device.

* * * * *